US009740653B2

(12) United States Patent
Wietfeldt

(10) Patent No.: US 9,740,653 B2
(45) Date of Patent: Aug. 22, 2017

(54) DYNAMICALLY ASSIGNING LANES OVER WHICH SIGNALS ARE TRANSMITTED TO MITIGATE ELECTROMAGNETIC INTERFERENCE (EMI)

(71) Applicant: QUALCOMM Incorporated, San Diego, CA (US)

(72) Inventor: Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 14/578,831

(22) Filed: Dec. 22, 2014

(65) Prior Publication Data
US 2016/0179741 A1    Jun. 23, 2016

(51) Int. Cl.
H05K 7/10 (2006.01)
G06F 13/42 (2006.01)
G06F 13/40 (2006.01)
G06F 15/163 (2006.01)
(Continued)

(52) U.S. Cl.
CPC ........ G06F 13/4221 (2013.01); G06F 13/409 (2013.01); G06F 13/4022 (2013.01); G06F 13/4282 (2013.01); G06F 13/4295 (2013.01); G06F 15/163 (2013.01); H04B 15/02 (2013.01); H04L 12/40169 (2013.01)

(58) Field of Classification Search
USPC ............... 710/300–311, 104–110; 455/63.1
See application file for complete search history.

(56) References Cited

U.S. PATENT DOCUMENTS 6,961,347 B1    11/2005    Bunton et al.
7,630,687 B2    12/2009    Madhavan et al.
(Continued)

FOREIGN PATENT DOCUMENTS

EP    2677664 A1    12/2013
WO    2014137523 A1    9/2014

OTHER PUBLICATIONS

International Search Report and Written Opinion for PCT/US2015/059381, mailed Feb. 4, 2016, 13 pages.

Primary Examiner — Raymond Phan
(74) Attorney, Agent, or Firm — Withrow & Terranova, PLLC

(57) ABSTRACT

Dynamic lane management for interference mitigation is disclosed. In one aspect, an integrated circuit (IC) is provided that employs a control system configured to mitigate electromagnetic interference (EMI) caused by an aggressor communications bus. The control system is configured to receive information related to EMI conditions and adjust which lanes of the aggressor communications bus are employed for signal transmission. The IC includes an interface configured to couple to the aggressor communications bus. The interface is configured to transmit signals to and receive signals from the aggressor communications bus. The control system is configured to use the information related to the EMI conditions to assign signals to be transmitted via particular lanes of the aggressor communications bus to mitigate the EMI experienced by a victim receiver. The control system provides designers with an additional tool that may reduce the performance degradation of the victim receiver attributable to EMI.

30 Claims, 6 Drawing Sheets

(51) Int. Cl.
*H04B 15/02* (2006.01)
*H04L 12/40* (2006.01)

(56) References Cited

U.S. PATENT DOCUMENTS

| | | |
|---|---|---|
| 8,503,940 B2 * | 8/2013 | Gebara .................. H04B 1/123 375/346 |
| 8,724,649 B2 | 5/2014 | Tal et al. |
| 2010/0137025 A1 | 6/2010 | Tal et al. |
| 2012/0144230 A1 | 6/2012 | Buckland et al. |
| 2013/0196654 A1 | 8/2013 | Wietfeldt |
| 2013/0346653 A1 | 12/2013 | Freking et al. |
| 2014/0256247 A1 | 9/2014 | Wietfeldt |

* cited by examiner

DYNAMICALLY ASSIGNING LANES OVER WHICH SIGNALS ARE TRANSMITTED TO MITIGATE ELECTROMAGNETIC INTERFERENCE (EMI)

BACKGROUND

I. Field of the Disclosure

The technology of the disclosure relates generally to electromagnetic interference (EMI), and particularly to mitigating effects of such EMI.

II. Background

Mobile computing devices, such as mobile phones and computer tablets, have become increasingly prevalent in contemporary society. These mobile computing devices commonly include multiple circuits that must operate concurrently for successful use of everyday functions. For example, a mobile computing device may be used to make phone calls or send e-mail messages via a wireless modem. The same mobile computing device may also perform other functions using other function-specific circuits, such as taking pictures with an integrated camera or viewing a video on an integrated display.

In this regard, each circuit communicates with a central processor configured to execute instructions related to such functions. More specifically, data and clock signals are exchanged between each circuit and a central processor during function execution. As the frequency of such signals increases, a greater amount of electromagnetic emissions is generated at each clock edge. This increase in electromagnetic emissions causes electromagnetic interference (EMI) that degrades the performance of other circuitry within the mobile computing device.

Additionally, continued miniaturization of mobile computing devices, combined with increased frequencies, further exacerbates the effects of EMI. In particular, as the circuit area within a mobile computing device decreases, circuit elements are placed closer together. This closer proximity of circuit elements increases the effects of EMI generated by the greater electromagnetic emissions resulting from higher frequencies. Therefore, it would be advantageous to provide designers with additional tools to mitigate the effects of EMI within mobile computing devices as frequency ranges continue to increase while device sizes decrease.

SUMMARY OF THE DISCLOSURE

Aspects disclosed in the detailed description include dynamic lane management for interference mitigation. In one aspect, an integrated circuit (IC) is provided that employs a control system configured to mitigate electromagnetic interference (EMI) caused by an aggressor communications bus. The control system is configured to receive information related to EMI conditions and adjust which lanes of the aggressor communications bus are employed for signal transmission. In this manner, the IC includes an interface configured to couple to the aggressor communications bus. The interface is configured to transmit signals to and receive signals from the aggressor communications bus. The control system is configured to use the information related to the EMI conditions to assign signals to be transmitted via particular lanes of the aggressor communications bus to mitigate the EMI experienced by a victim receiver. Thus, the control system provides designers with an additional tool that may reduce the performance degradation of the victim receiver attributable to EMI.

In this regard in one aspect, an application processor is disclosed. The application processor comprises an interface. The interface is configured to couple to an aggressor communications bus. The interface is further configured to transmit one or more application processor signals to the aggressor communications bus and receive one or more transceiver signals from the aggressor communications bus. The application processor further comprises a control system. The control system is configured to receive information from a coexistence manager, wherein the information is related to EMI of a victim receiver as a result of the aggressor communications bus. The control system is further configured to assign the one or more application processor signals to be transmitted to the aggressor communications bus to one or more lanes associated with the interface to mitigate the EMI experienced by the victim receiver and allow the victim receiver to operate at or above an acceptable performance level. The control system is further configured to instruct a transceiver to assign the one or more transceiver signals to be transmitted to the aggressor communications bus to the one or more lanes associated with the interface to mitigate the EMI experienced by the victim receiver and allow the victim receiver to operate at or above the acceptable performance level.

In another exemplary aspect, a method for mitigating EMI experienced by a victim receiver as a result of an aggressor communications bus is disclosed. The method comprises receiving information from a coexistence manager, wherein the information is related to EMI of a victim receiver as a result of an aggressor communications bus. The method further comprises assigning one or more application processor signals to be transmitted to the aggressor communications bus to one or more lanes associated with an interface to mitigate the EMI experienced by the victim receiver and allow the victim receiver to operate at or above an acceptable performance level. The method further comprises instructing a transceiver to assign one or more transceiver signals to be transmitted to the aggressor communications bus to the one or more lanes associated with the interface to mitigate the EMI experienced by the victim receiver and allow the victim receiver to operate at or above the acceptable performance level.

In another exemplary aspect, a transceiver is disclosed. The transceiver comprises an interface. The interface is configured to couple to an aggressor communications bus. The interface is further configured to transmit one or more transceiver signals to the aggressor communications bus and receive one or more application processor signals from the aggressor communications bus. The transceiver further comprises a control system. The control system is configured to receive information related to EMI of a victim receiver as a result of the aggressor communications bus. The control system is further configured to assign the one or more transceiver signals to be transmitted to the aggressor communications bus to one or more lanes associated with the interface to mitigate the EMI experienced by the victim receiver and allow the victim receiver to operate at or above an acceptable performance level.

In another exemplary aspect, a method for mitigating EMI experienced by a victim receiver as a result of an aggressor communications bus is disclosed. The method comprises receiving information related to EMI of a victim receiver as a result of an aggressor communications bus. The method further comprises assigning one or more transceiver signals to be transmitted to the aggressor communications bus to one or more lanes associated with an interface to mitigate the EMI experienced by the victim receiver and allow the victim receiver to operate at or above an acceptable performance level.

DETAILED DESCRIPTION

Figure 1:
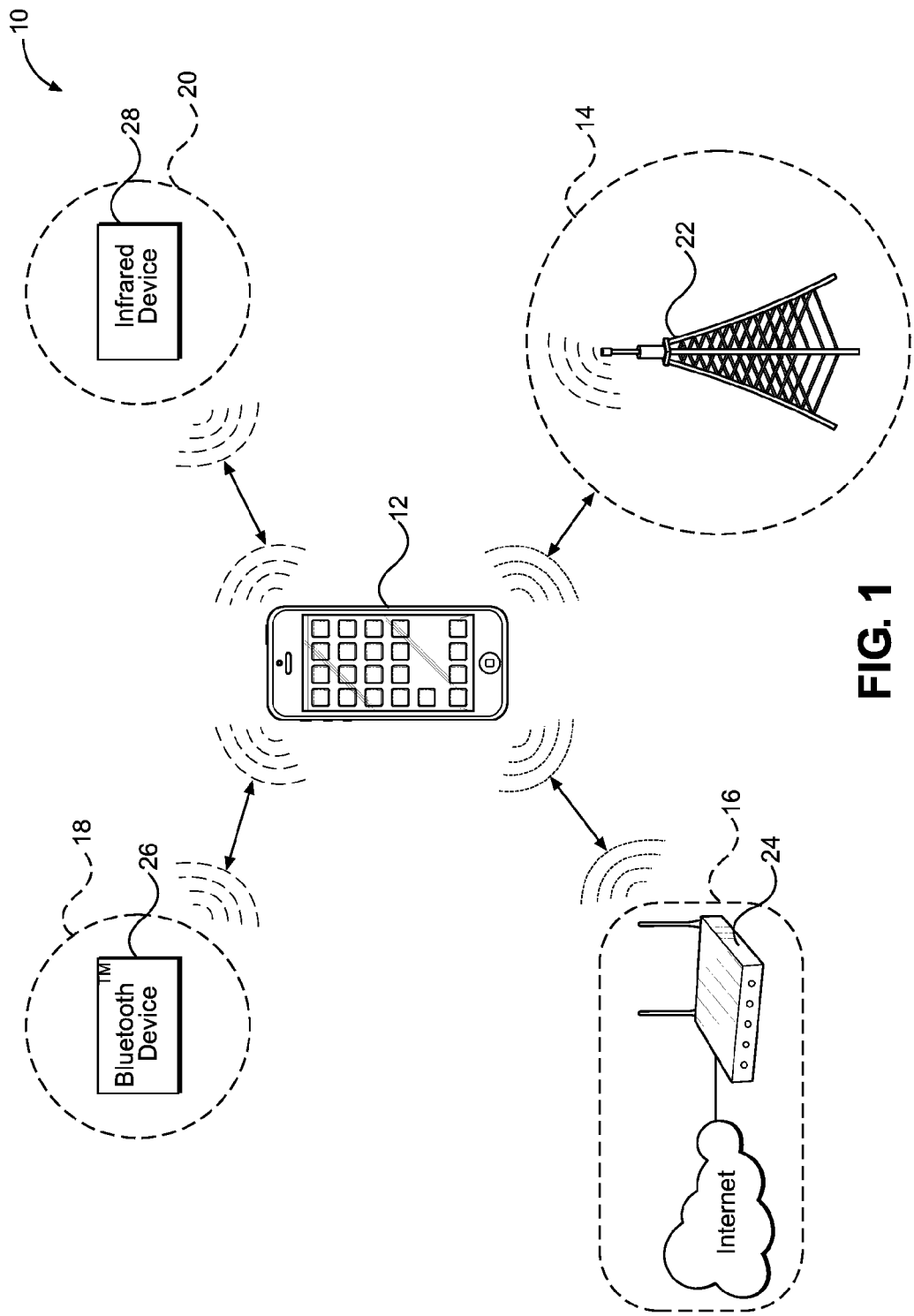
FIG. 1 is an illustration of an exemplary mobile computing device in a communications environment employing a plurality of networks.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include dynamic lane management for interference mitigation. In one aspect, an integrated circuit (IC) is provided that employs a control system configured to mitigate electromagnetic interference (EMI) caused by an aggressor communications bus. The control system is configured to receive information related to EMI conditions and adjust which lanes of the aggressor communications bus are employed for signal transmission. In this manner, the IC includes an interface configured to couple to the aggressor communications bus. The interface is configured to transmit signals to and receive signals from the aggressor communications bus. The control system is configured to use the information related to the EMI conditions to assign signals to be transmitted via particular lanes of the aggressor communications bus to mitigate the EMI experienced by a victim receiver. Thus, the control system provides designers with an additional tool that may reduce the performance degradation of the victim receiver attributable to EMI.

Before addressing exemplary aspects of the present disclosure, additional material is provided about the nature of EMI. In this regard, FIG. 1 illustrates a simplified diagram of an exemplary communications environment 10 that includes a mobile computing device 12 operating with a plurality of networks 14, 16, 18, and 20. The mobile computing device 12 communicates with each of the networks 14, 16, 18, and 20 separately, as the networks 14, 16, 18, and 20 each employ a different communications technology. For example, the network 14 includes a cellular base station 22 designed to support functions such as cellular phone and data communications with the mobile computing device 12. The network 16 is configured to support wireless fidelity ("Wi-Fi") communications, allowing the mobile computing device 12 to connect to other networks, such as the Internet, by way of a Wi-Fi router 24. The network 18 is configured to support Bluetooth™ technology, providing the mobile computing device 12 with the opportunity to communicate with a Bluetooth™-enabled device 26. Further, the network 20 supports communications within the infrared spectrum, thereby enabling the mobile computing device 12 to interact with an infrared device 28, such as a stereo receiver. However, to support such communications with the networks 14, 16, 18, and 20, the mobile computing device 12 includes circuit components individually configured to communicate with a particular communications technology.

Figure 2:
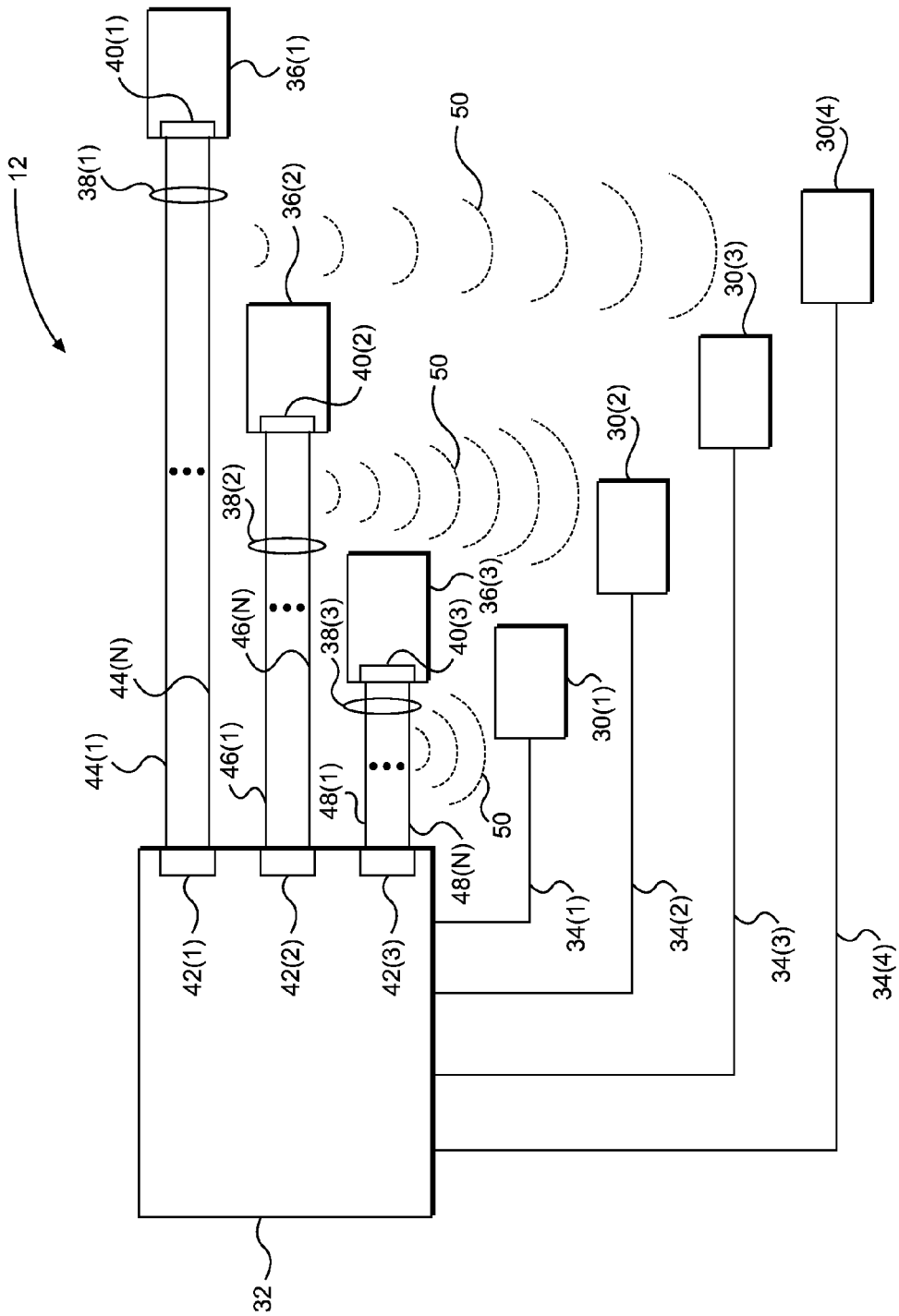
FIG. 2 is a simplified block diagram of internal circuitry of the mobile computing device of FIG. 1.

In this regard, FIG. 2 illustrates a simplified block diagram of the internal circuitry of the mobile computing device 12 of FIG. 1. More specifically, the mobile computing device 12 includes modems 30(1)-30(4), wherein each modem 30(1)-30(4) is configured to communicate with one of the networks 14, 16, 18, and 20, respectively, in FIG. 1. For example, the modem 30(1) is configured to conduct cellular communications with the network 14, while the modem 30(2) is configured to support Wi-Fi communications with the network 16. Further, the modem 30(3) supports communications via the Bluetooth™ protocol with the network 18, and the modem 30(4) provides infrared communications capability with the network 20. Each modem 30(1)-30(4) is coupled to an application processor 32 via a respective bus 34(1)-34(4), wherein the application processor 32 provides processing support for each of the respective modems 30(1)-30(4).

With continuing reference to FIG. 2, in addition to the modems 30(1)-30(4) that provide various communications capabilities, the mobile computing device 12 includes transceivers 36(1)-36(3). Each of the transceivers 36(1)-36(3) is incorporated into an element that enables the mobile computing device 12 to perform a corresponding non-modem-based function. For example, the transceiver 36(1) may be associated with a camera, thereby enabling the mobile computing device 12 to take photographs. Further, the transceiver 36(2) may be associated with a display that allows the mobile computing device 12 to display a video. Further, the transceiver 36(3) may be associated with memory employed to store data necessary for the successful implementation of the functions within the mobile computing device 12.

With continuing reference to FIG. 2, each transceiver 36(1)-36(3) is communicatively coupled to the application processor 32 via a corresponding aggressor communications bus 38(1)-38(3). In this regard, each aggressor communications bus 38(1)-38(3) couples to an interface 40(1)-40(3) in the corresponding transceiver 36(1)-36(3), and also couples to corresponding interfaces 42(1)-42(3) in the application processor 32. To achieve communications between the application processor 32 and each transceiver 36(1)-36(3), each aggressor communications bus 38(1)-38(3) includes multiple lanes configured to transfer clock and data signals (not shown) between each transceiver 36(1)-36(3) and the application processor 32. Thus, the aggressor communications bus 38(1) includes lanes 44(1)-44(N), the aggressor communications bus 38(2) includes lanes 46(1)-46(N), and the aggressor communications bus 38(3) includes lanes 48(1)-48(N). Notably, the modems 30(1)-30(4), the application processor 32, and the transceivers 36(1)-36(3) may be provided on separate chips, on a single system-on-a-chip (SOC), or a combination thereof. Thus, the buses 34(1)-34(4) and the aggressor communications buses 38(1)-38(3) may be internal or external to a SOC, depending on the implementation of the corresponding elements. Further, each aggressor communications bus 38(1)-38(3) may be configured to be compatible with a particular protocol, wherein the particular protocol of each aggressor communications bus 38(1)-38(3) determines which signals are assigned to the corresponding lanes 44(1)-44(N), 46(1)-46(N), and 48(1)-48(N). As a non-limiting example, the aggressor communications bus 38(1) may be a Peripheral Component Interconnect (PCI) bus. In this regard, as defined by the PCI standard, the names and uses of the pins of the aggressor communications bus 38(1) are summarized in TABLE 1 set forth below.

TABLE 1

Conventional PCI Standard-A Connector
Pin Assignment and Mating Sequence

| Pin | Side B | Side A | Comments |
|---|---|---|---|
| 1 | +12 V | PRSNT1# | Pulled low to indicate card inserted |
| 2 | +12 V | +12 V | |
| 3 | +12 V | +12 V | |
| 4 | Ground | Ground | |
| 5 | SMCLK | TCK | SMBus and JTAG port pins |
| 6 | SMDAT | TDI | |
| 7 | Ground | TDO | |
| 8 | +3.3 V | TMS | |
| 9 | TRST# | +3.3 V | |
| 10 | +3.3 V aux | +3.3 V | Standby power |
| 11 | Wake# | PWRGD | Link reactivation, power good |
| | Key Notch | | |
| 12 | Reserved | Ground | |
| 13 | Ground | REFCLK+ | Reference clock differential pair |
| 14 | HSOp(0) | REFCLK− | Lane 0 transmit data + and − |
| 15 | HSOn(0) | Ground | |
| 16 | Ground | HSlp(0) | Lane 0 receive data + and − |
| 17 | PRSNT2# | HSln(0) | |
| 18 | Ground | Ground | |
| | End x1 connector | | |
| 19 | HSOp(1) | Reserved | Lane 1 transmit data + and − |
| 20 | HSOn(1) | Ground | |
| 21 | Ground | HSlp(1) | Lane 1 receive data + and − |
| 22 | Ground | HSln(1) | |
| 23 | HSOp(2) | Ground | Lane 2 transmit data + and − |
| 24 | HSOn(2) | Ground | |
| 25 | Ground | HSlp(2) | Lane 2 receive data + and − |
| 26 | Ground | HSln(2) | |
| 27 | HSOp(3) | Ground | Lane 3 transmit data + and − |
| 28 | HSOn(3) | Ground | |
| 29 | Ground | HSlp(3) | Lane 3 receive data + and − |
| 30 | Reserved | HSln(3) | |
| 31 | PRSNT2# | Ground | |
| 32 | Ground | Reserved | |
| | End x4 connector | | |
| 33 | HSOp(4) | Reserved | Lane 4 transmit data + and − |
| 34 | HSOn(4) | Ground | |
| 35 | Ground | HSlp(4) | Lane 4 receive data + and − |
| 36 | Ground | HSln(4) | |
| 37 | HSOp(5) | Ground | Lane 5 transmit data + and − |
| 38 | HSOn(5) | Ground | |
| 39 | Ground | HSlp(5) | Lane 5 receive data + and − |
| 40 | Ground | HSln(5) | |
| 41 | HSOp(6) | Ground | Lane 6 transmit data + and − |
| 42 | HSOn(6) | Ground | |
| 43 | Ground | HSlp(6) | Lane 6 receive data + and − |
| 44 | Ground | HSln(6) | |
| 45 | HSOp(7) | Ground | Lane 7 transmit data + and − |
| 46 | HSOn(7) | Ground | |
| 47 | Ground | HSlp(7) | Lane 7 receive data + and − |
| 48 | PRSNT2# | HSln(7) | |

TABLE 1-continued

Conventional PCI Standard-A Connector
Pin Assignment and Mating Sequence

| Pin | Side B | Side A | Comments |
|---|---|---|---|
| 49 | Ground | Ground | |
| | End x8 connector | | |
| 50 | HSOp(8) | Reserved | Lane 8 transmit data + and − |
| 51 | HSOn(8) | Ground | |
| 52 | Ground | HSlp(8) | Lane 8 receive data + and − |
| 53 | Ground | HSln(8) | |
| 54 | HSOp(9) | Ground | Lane 9 transmit data + and − |
| 55 | HSOn(9) | Ground | |
| 56 | Ground | HSlp(9) | Lane 9 receive data + and − |
| 57 | Ground | HSln(9) | |
| 58 | HSOp(10) | Ground | Lane 10 transmit data + and − |
| 59 | HSOn(10) | Ground | |
| 60 | Ground | HSlp(10) | Lane 10 receive data + and − |
| 61 | Ground | HSln(10) | |
| 62 | HSOp(11) | Ground | Lane 11 transmit data + and − |
| 63 | HSOn(11) | Ground | |
| 64 | Ground | HSlp(11) | Lane 11 receive data + and − |
| 65 | Ground | HSln(11) | |
| 66 | HSOp(12) | Ground | Lane 12 transmit data + and − |
| 67 | HSOn(12) | Ground | |
| 68 | Ground | HSlp(12) | Lane 12 receive data + and − |
| 69 | Ground | HSln(12) | |
| 70 | HSOp(13) | Ground | Lane 13 transmit data + and − |
| 71 | HSOn(13) | Ground | |
| 72 | Ground | HSlp(13) | Lane 13 receive data + and − |
| 73 | Ground | HSln(13) | |
| 74 | HSOp(14) | Ground | Lane 14 transmit data + and − |
| 75 | HSOn(14) | Ground | |
| 76 | Ground | HSlp(14) | Lane 14 receive data + and − |
| 77 | Ground | HSln(14) | |
| 78 | HSOp(15) | Ground | Lane 15 transmit data + and − |
| 79 | HSOn(15) | Ground | |
| 80 | Ground | HSlp(15) | Lane 15 receive data + and − |
| 81 | PRSNT2# | HSln(15) | |
| 82 | Reserved | Ground | |

In this regard, with reference to TABLE 1, pin 13 in the PCI protocol, which corresponds to the lane 44(N) on the aggressor communications bus 38(1) in this example, is configured to transfer the clock signal. Further, pins 14-15 in the PCI protocol are configured to transmit data signals associated with a "Lane 0," which corresponds to the lane 44(1) on the aggressor communications bus 38(1) in this example. Additionally, pins 16-17 in the PCI protocol are configured to receive data signals associated with the "Lane 0," corresponding to the lane 44(1). Notably, each aggressor communications bus 38(1)-38(3) may be employed using various protocols. In this manner, as non-limiting examples, each aggressor communications bus 38(1)-38(3) may be employed as a PCI Express (PCIe) bus, a SuperSpeed Universal Serial Bus Inter-Chip (SSIC) bus, or a Universal Flash Storage (UFS) bus.

With continuing reference to FIG. 2, although the transceivers 36(1)-36(3) provide the mobile computing device 12 with a range of functionality, such circuitry may also degrade the performance of the modems 30(1)-30(4). In this regard, the clock and data signals transferred between each transceiver 36(1)-36(3) and the application processor 32 over each respective aggressor communications bus 38(1)-38(3) may be sources of interference for the modems 30(1)-30(4). Particularly at higher frequencies, these signals generate electromagnetic emissions 50 at each clock edge (not shown). Such electromagnetic emissions 50 cause EMI that degrades the operation of the modems 30(1)-30(4). For example, the EMI may alter the cellular, wireless, Bluetooth™, or infrared signals sent from and received by the modems 30(1)-30(4), respectively. Altering these signals may produce errors in the information exchanged between the modems 30(1)-30(4) and the corresponding networks 14, 16, 18, and 20, thus degrading performance.

Figure 3:
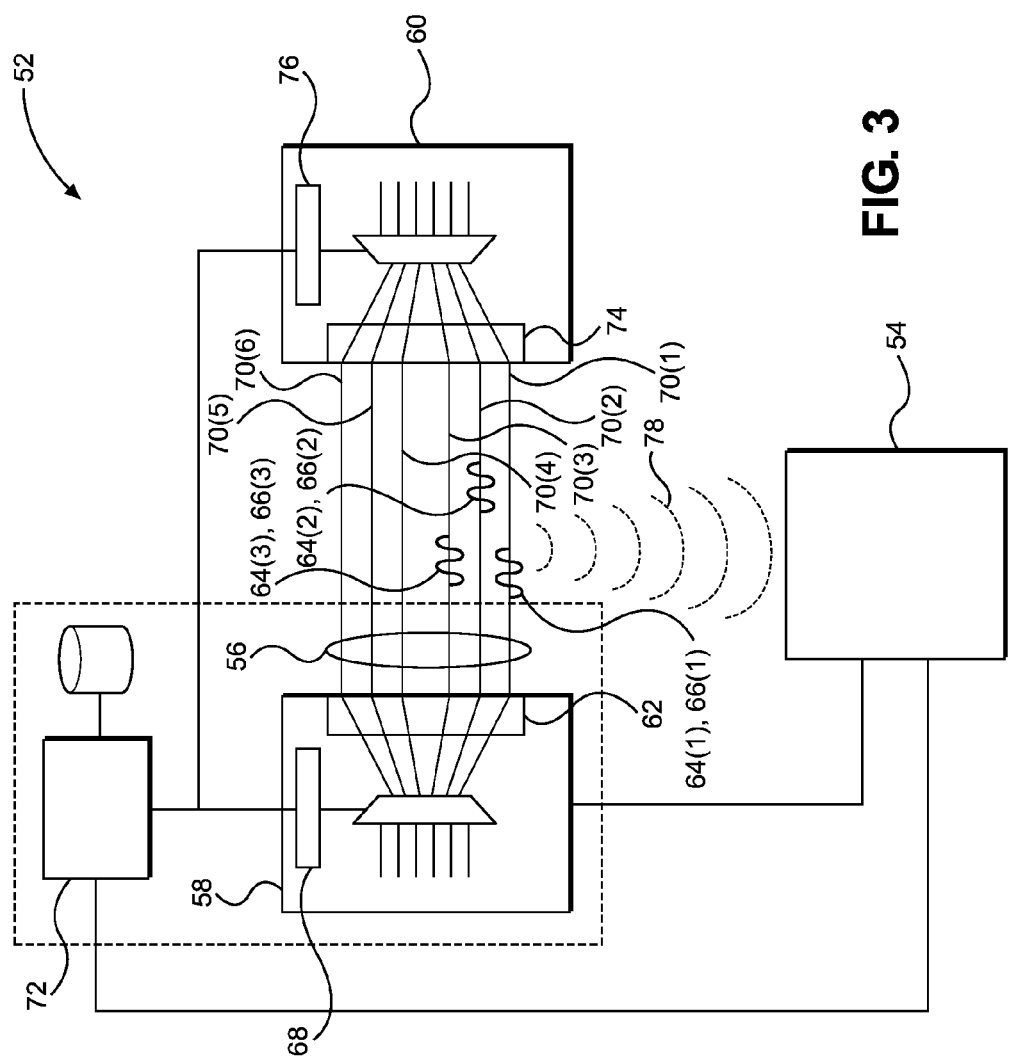
FIG. 3 is a block diagram of an exemplary computing device employing a control system configured to manage dynamically lanes corresponding to an aggressor communications bus to mitigate electromagnetic interference (EMI) experienced by a victim receiver.

In this regard, FIG. 3 illustrates an exemplary computing device 52 that employs dynamic lane management to mitigate EMI of a victim receiver 54 caused by an aggressor communications bus 56 within the computing device 52. In this aspect, the computing device 52 includes an application processor 58 communicatively coupled to a transceiver 60 via the aggressor communications bus 56. The application processor 58 includes an interface 62 configured to couple to the aggressor communications bus 56. The interface 62 is configured to transmit application processor signals 64(1)-64(3) to the aggressor communications bus 56, wherein the application processor signals 64(1)-64(3) are to be provided to the transceiver 60. Further, the interface 62 is configured to receive transceiver signals 66(1)-66(3) from the aggressor communications bus 56, wherein the transceiver signals 66(1)-66(3) are provided by the transceiver 60. The application processor 58 also includes a control system 68 configured to manage to which lanes 70(1)-70(6) of the aggressor communications bus 56 the application processor signals 64(1)-64(3) and the transceiver signals 66(1)-66(3) are assigned based on information received from a coexistence manager 72, wherein the information is related to the EMI of the victim receiver 54.

With continuing reference to FIG. 3, the transceiver 60 includes an interface 74 configured to couple to the aggressor communications bus 56. The interface 74 employed by the transceiver 60 is configured to receive the application processor signals 64(1)-64(3) from the aggressor communications bus 56, and is also configured to transmit the transceiver signals 66(1)-66(3) to the aggressor communications bus 56. Similar to the application processor 58, the transceiver 60 includes a control system 76 configured to manage to which lanes 70(1)-70(6) of the aggressor communications bus 56 the transceiver signals 66(1)-66(3) are assigned.

With continuing reference to FIG. 3, the application processor signals 64(1)-64(3) and the transceiver signals 66(1)-66(3) are transmitted between the application processor 58 and the transceiver 60 via the aggressor communications bus 56. Notably, the application processor signals 64(1)-64(3) and the transceiver signals 66(1)-66(3) may be data and/or clock signals, wherein each may have independent frequencies. As the application processor signals 64(1)-64(3) and the transceiver signals 66(1)-66(3) traverse across the aggressor communications bus 56, such signal activity generates electromagnetic emissions 78. Because the application processor signals 64(1)-64(3) and the transceiver signals 66(1)-66(3) are transmitted via the lanes 70(1)-70(3), the electromagnetic emissions 78 are generated within close proximity of the victim receiver 54. Thus, the electromagnetic emissions 78 cause EMI that degrades the performance of the victim receiver 54.

Figure 4:
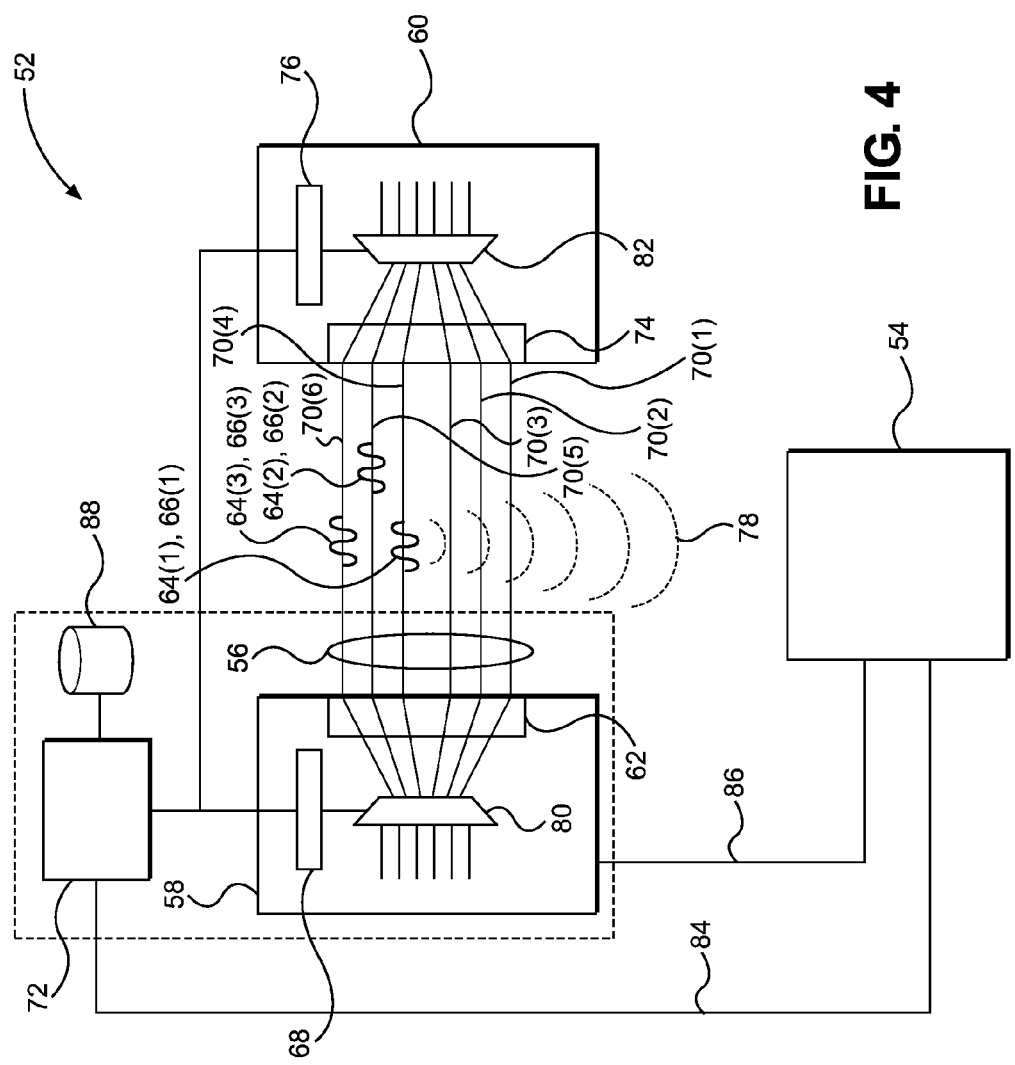
FIG. 4 is a block diagram of the computing device in FIG. 3 illustrating signal configuration resulting from dynamically managing lanes corresponding to the aggressor communications bus to mitigate the EMI experienced by the victim receiver.

In this regard, FIG. 4 illustrates the results of dynamically managing the lanes 70(1)-70(6) of the aggressor communications bus 56 to mitigate the EMI of the victim receiver 54 in the computing device 52 illustrated in FIG. 3. In this aspect, the control systems 68, 76 employed by the application processor 58 and the transceiver 60, respectively, are configured to employ dynamic lane management to mitigate the EMI of the victim receiver 54. To achieve such dynamic lane management, each control system 68, 76 is configured to receive information related to the EMI of the victim receiver 54 caused by the aggressor communications bus 56.

Using such information, the control systems 68, 76 are configured to assign the application processor signals 64(1)-64(3) and the transceiver signals 66(1)-66(3) to be transmitted to particular lanes 70(1)-70(6) associated with the interfaces 62, 74, respectively, so as to mitigate the EMI and allow the victim receiver 54 to operate at or above an acceptable performance level.

With continuing reference to FIG. 4, in this aspect, the control systems 68, 76 are configured to use the information related to the EMI of the victim receiver 54 to assign the application processor signals 64(1)-64(3) and the transceiver signals 66(1)-66(3) to be transmitted to the lanes located at a furthest physical distance from the victim receiver 54. Thus, the control systems 68, 76 are configured to assign the application processor signals 64(1)-64(3) and the transceiver signals 66(1)-66(3) to be transmitted to the lanes 70(4)-70(6), respectively, as opposed to the lanes 70(1)-70(3) as illustrated in FIG. 3. In this aspect the application processor 58 employs a multiplexer 80 to provide the application processor signals 64(1)-64(3) to the lanes 70(4)-70(6), and the transceiver 60 employs a multiplexer 82 to provide the transceiver signals 66(1)-66(3) to the lanes 70(4)-70(6). By assigning the application processor signals 64(1)-64(3) and the transceiver signals 66(1)-66(3) to be transmitted to the lanes 70(4)-70(6), a greater distance separates the electromagnetic emissions 78 and the victim receiver 54. In this aspect, because the electromagnetic emissions 78 are generated further away from the victim receiver 54, the electromagnetic emissions 78 dissipate to a lower level before reaching the vicinity of the victim receiver 54. Thus, the effect of the corresponding EMI on the victim receiver 54 is mitigated. In this manner, the control systems 68, 76 provide designers with an additional tool that may reduce the performance degradation of the victim receiver 54 attributable to the EMI. Notably, in alternative aspects, assigning the application processor signals 64(1)-64(3) and the transceiver signals 66(1)-66(3) to the lanes 70(4)-70(6) located at the furthest physical distance from the victim receiver 54 may not provide the desired EMI mitigation. In such alternative aspects, other factors within the mobile computing device 12, such as parasitic noise effects in signal routing and ground effects in an SOC, may result in assigning the application processor signals 64(1)-64(3) and the transceiver signals 66(1)-66(3) to the lanes 70 that are closer in proximity to the victim receiver 54 to achieve the desired EMI mitigation.

In this regard, employing dynamic lane management to assign the application processor signals 64(1)-64(3) and the transceiver signals 66(1)-66(3) to be transmitted to the lanes 70(4)-70(6) as described above may be achieved in multiple aspects of the present disclosure. The details of such multiple aspects are now described. Notably, in the exemplary aspects described herein, the coexistence manager 72, the control system 68 of the application processor 58, the control system 76 of the transceiver 60, or a combination thereof, is configured to perform functions such as determining lane assignments. However, references to the application processor 58 or the transceiver 60 being configured to perform functions such as determining lane assignments are to be understood as referring to the control systems 68, 76, respectively, being configured to perform such functions. Further, in alternative aspects, other elements associated with the application processor 58 and the transceiver 60 may be configured to perform such functions. Additionally, although the exemplary aspects provided herein describe the victim receiver 54 as a wireless receiver, similar EMI mitigation results may be achieved in aspects employing the victim receiver 54 as a wired receiver.

With continuing reference to FIG. 4, in one exemplary aspect, the coexistence manager 72 is configured to determine assignment of the lanes 70(1)-70(6), and communicate such information to the application processor 58. Further, the application processor 58 is configured to provide the lane assignment information to the transceiver 60. In this manner, the coexistence manager 72 is configured to receive information indicating if the victim receiver 54 experiences EMI as a result of the aggressor communications bus 56. Notably, such information is provided via a bus 84 that communicatively couples the victim receiver 54 to the coexistence manager 72, wherein the victim receiver 54 is also communicatively coupled to the application processor 58 via a bus 86. The coexistence manager 72 is configured to use the information to determine an acceptable performance level of the victim receiver 54. Further, the coexistence manager 72 is configured to determine the lanes 70(1)-70(6) associated with the interfaces 62, 74 of the application processor 58 and the transceiver 60, respectively, to which to assign the application processor signals 64(1)-64(3) and the transceiver signals 66(1)-66(3). In making such a determination, the coexistence manager 72 takes into account which of the lanes 70(1)-70(6) will mitigate the EMI experienced by the victim receiver 54, while also allowing the victim receiver 54 to operate at or above the acceptable performance level. Further, in this aspect the coexistence manager 72 is configured to communicate with a database 88, wherein the database 88 is configured to store information related to the victim receiver 54 and its operation. As a non-limiting example, such information may include database entries (not shown) that correlate particular performance metrics of the victim receiver 54 to particular lane assignments, wherein such information is accessed by the coexistence manager 72 via a look-up table (not shown) stored in the database 88.

With continuing reference to FIG. 4, in response to making the above determinations, the coexistence manager 72 is configured to provide information concerning lane assignments to the application processor 58. Such information includes the lanes 70(1)-70(6) associated with the interface 62 to which to assign the application processor 58 to transmit the application processor signals 64(1)-64(3). Further, the information includes the lanes 70(1)-70(6) associated with the interface 74 to which the application processor 58 is to instruct the transceiver 60 to assign the transceiver signals 66(1)-66(3) to be transmitted. Thus, in addition to assigning the application processor signals 64(1)-64(3) to transmit to the lanes 70(4)-70(6), the application processor 58 is configured to instruct the transceiver 60 to transmit the transceiver signals 66(1)-66(3) to the lanes 70(4)-70(6).

With continuing reference to FIG. 4, in another exemplary aspect, the application processor 58 is configured to determine assignment of the lanes 70(1)-70(6), as opposed to the coexistence manager 72 making the determination. Further, the application processor 58 is configured to provide the lane assignment information to the transceiver 60. In this manner, rather than receiving the lane assignment information as in the previously described aspect, the application processor 58 is configured to receive information from the coexistence manager 72 indicating if the victim receiver 54 experiences EMI as a result of the aggressor communications bus 56. Additionally, the application processor 58 is configured to receive information related to the acceptable performance level of the victim receiver 54. Using such information, the application processor 58 is configured to determine the lanes 70(1)-70(6) associated with the interfaces 62, 74 of the application processor 58 and the transceiver 60, respectively, to which to assign the application processor signals 64(1)-64(3) and the transceiver signals 66(1)-66(3). In making this determination, the application processor 58 takes into account which of the lanes 70(1)-70(6) will mitigate the EMI experienced by the victim receiver 54, while also allowing the victim receiver 54 to operate at or above the acceptable performance level. Thus, in addition to being configured to assign the application processor signals 64(1)-64(3) to be transmitted to the lanes 70(4)-70(6), the application processor 58 is configured to instruct the transceiver 60 to transmit the transceiver signals 66(1)-66(3) to the lanes 70(4)-70(6).

With continuing reference to FIG. 4, in another exemplary aspect, the coexistence manager 72 is configured to determine assignment of the lanes 70(1)-70(6), and communicate such information directly to the application processor 58 and the transceiver 60. In this manner, the coexistence manager 72 is configured to receive information indicating if the victim receiver 54 experiences EMI as a result of the aggressor communications bus 56. The coexistence manager 72 is configured to use the information to determine an acceptable performance level of the victim receiver 54. Further, the coexistence manager 72 determines the lanes 70(1)-70(6) associated with the interfaces 62, 74 of the application processor 58 and the transceiver 60, respectively, to which to assign the application processor signals 64(1)-64(3) and the transceiver signals 66(1)-66(3). In response to making the above determinations, the coexistence manager 72 is configured to provide information to the application processor 58 to assign the application processor signals 64(1)-64(3) to transmit to the lanes 70(4)-70(6). The coexistence manager 72 is also configured to provide information to the transceiver 60 concerning assigning the transceiver signals 66(1)-66(3) to transmit to the lanes 70(4)-70(6).

With continuing reference to FIG. 4, in another exemplary aspect, the application processor 58 and the transceiver 60 are each configured to determine assignment of the lanes 70(1)-70(6), as opposed to the coexistence manager 72 making the determination. In this manner, both the application processor 58 and the transceiver 60 are configured to receive information from the coexistence manager 72 indicating if the victim receiver 54 experiences EMI as a result of the aggressor communications bus 56. Additionally, the application processor 58 and the transceiver 60 are configured to receive information related to the acceptable performance level of the victim receiver 54. Using such information, the application processor 58 and the transceiver 60 are configured to determine the lanes 70(1)-70(6) to which to assign the application processor signals 64(1)-64(3) and the transceiver signals 66(1)-66(3), respectively. In making this determination, the application processor 58 and the transceiver 60 take into account which lanes 70(1)-70(6) will mitigate the EMI experienced by the victim receiver 54, while also allowing the victim receiver 54 to operate at or above the acceptable performance level. Thus, in this aspect, the application processor 58 is configured to determine the assignment of the application processor signals 64(1)-64(3) to transmit to the lanes 70(4)-70(6). Similarly, the transceiver 60 is configured to determine the assignment of the transceiver signals 66(1)-66(3) to transmit to the lanes 70(4)-70(6). Further, if the application processor 58 determines a lane assignment that differs from the lane assignment determined by the transceiver 60, an element such as the coexistence manager 72, the control system 68, the control system 76, or a combination thereof, may be configured to resolve such a conflict. Such conflict resolution is employed so that the application processor signals 64(1)-64(3) and the transceiver signals 66(1)-66(3) are assigned to the same subset of the lanes 70(1)-70(6) to best mitigate EMI of the victim receiver 54. However, other aspects may not be configured to assign the application processor signals 64(1)-64(3) and the transceiver signals 66(1)-66(3) to the same subset of the lanes 70(1)-70(6).

With continuing reference to FIG. 4, in another exemplary aspect, the coexistence manager 72 is configured to determine assignment of the lanes 70(1)-70(6), and communicate such information to the transceiver 60. The transceiver 60 is configured to provide the lane assignment information to the application processor 58. In this manner, the coexistence manager 72 is configured to receive information indicating if the victim receiver 54 experiences EMI as a result of the aggressor communications bus 56. The coexistence manager 72 uses the information to determine an acceptable performance level of the victim receiver 54. The coexistence manager 72 is configured to determine the lanes 70(1)-70(6) associated with the interfaces 62, 74 of the application processor 58 and the transceiver 60, respectively, to which to assign the application processor signals 64(1)-64(3) and the transceiver signals 66(1)-66(3). In making such a determination, the coexistence manager 72 takes into account which lanes 70(1)-70(6) will mitigate the EMI experienced by the victim receiver 54, while also allowing the victim receiver 54 to operate at or above the acceptable performance level. In response to making the above determinations, the coexistence manager 72 is configured to provide information concerning lane assignments to the transceiver 60. Such information includes the lanes 70(1)-70(6) to which to assign the transceiver 60 to transmit the transceiver signals 66(1)-66(3). Further, the information includes the lanes 70(1)-70(6) to which the transceiver 60 is to instruct the application processor 58 to assign the application processor signals 64(1)-64(3) to be transmitted. Thus, in addition to assigning the transceiver signals 66(1)-66(3) to transmit to the lanes 70(4)-70(6), the transceiver 60 is configured to instruct the application processor 58 on which lanes 70(4)-70(6) to transmit the application processor signals 64(1)-64(3).

With continuing reference to FIG. 4, in another exemplary aspect, the transceiver 60 is configured to determine assignment of the lanes 70(1)-70(6), as opposed to the coexistence manager 72 making the determination. The transceiver 60 is configured to provide the lane assignment information to the application processor 58. In this manner, rather than receiving the lane assignment information, the transceiver 60 is configured to receive information from the coexistence manager 72 indicating if the victim receiver 54 experiences EMI as a result of the aggressor communications bus 56, and information related to the acceptable performance level of the victim receiver 54. Using such information, the transceiver 60 is configured to determine the lanes 70(1)-70(6) to which to assign the application processor signals 64(1)-64(3) and the transceiver signals 66(1)-66(3). In making this determination, the transceiver 60 takes into account which of the lanes 70(1)-70(6) will mitigate the EMI experienced by the victim receiver 54, while also allowing the victim receiver 54 to operate at or above the acceptable performance level. Thus, in addition to being configured to assign the transceiver signals 66(1)-66(3) to be transmitted to the lanes 70(4)-70(6), the transceiver 60 is configured to instruct the transceiver 60 to transmit the transceiver signals 66(1)-66(3) to the lanes 70(4)-70(6).

With continuing reference to FIG. 4, the exemplary aspects previously described employ a number of lanes 70(1)-70(6) that is greater than a number of application processor signals 64(1)-64(3) and transceiver signals 66(1)-66(3), respectively (e.g., six (6) lanes 70 are greater in number than three (3) application processor signals 64 or three (3) transceiver signals 66). Such an overprovision of the number of lanes 70(1)-70(6) provides greater flexibility in dynamically managing the lanes 70(1)-70(6) so as to mitigate EMI. However, other aspects may achieve EMI mitigation without such an overprovision of lanes 70(1)-70(6). Further, the exemplary aspects previously described include the coexistence manager 72 employed remotely from the application processor 58. However, other aspects may achieve similar functionality when employing the coexistence manager 72 within the application processor 58. Additionally, the aspects disclosed herein may be employed using various protocols for the aggressor communications bus 56. In this manner, as non-limiting examples, the aggressor communications bus 56 may be employed as a PCI bus, a PCIe bus, an SSIC bus, or a UFS bus. Thus, employing the aspects disclosed herein provides designers with additional tools that may reduce the performance degradation of the victim receiver 54 attributable to EMI.

Figure 5:
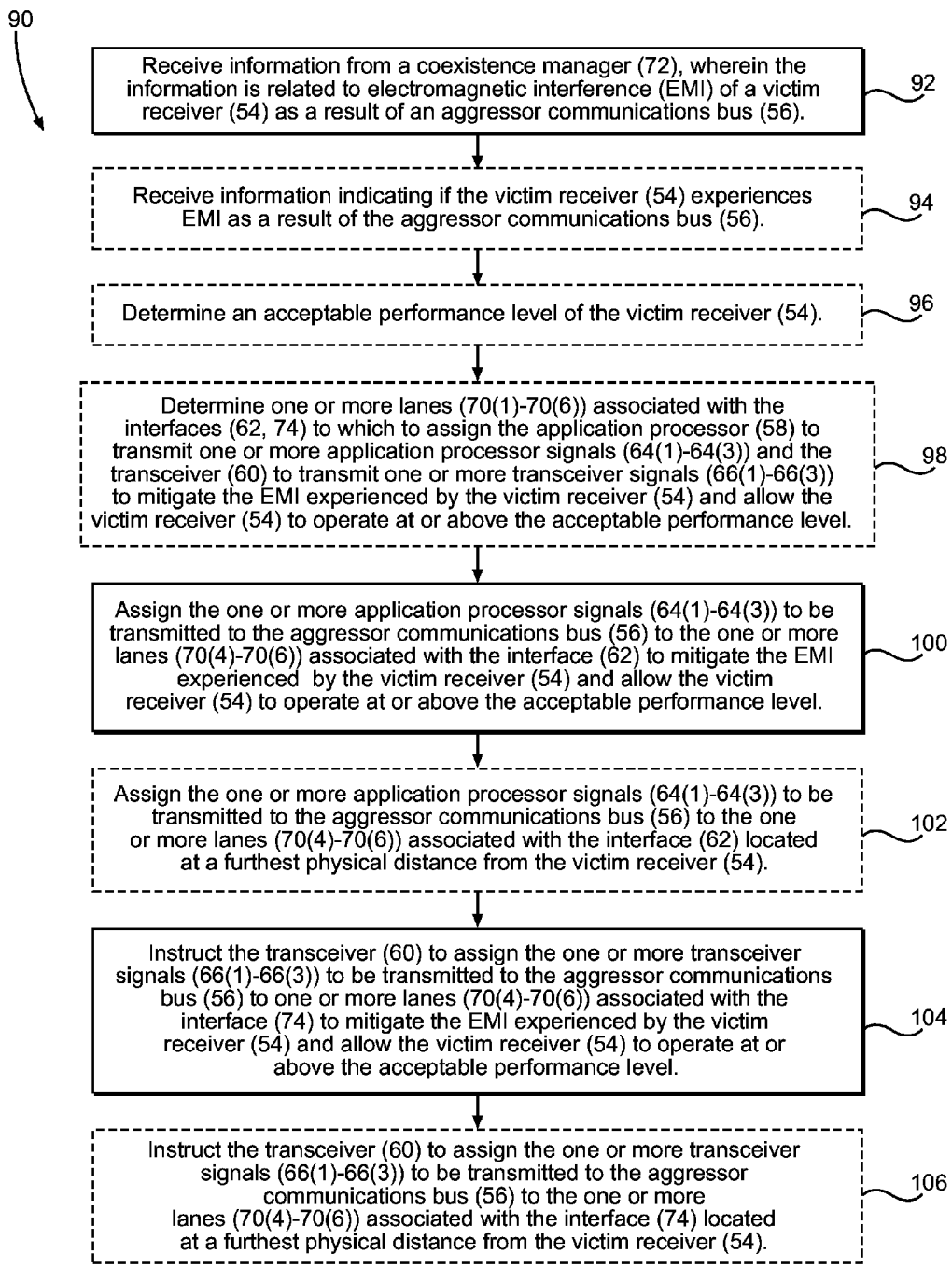
FIG. 5 is a flowchart illustrating an exemplary process for mitigating the EMI of the victim receiver caused by the aggressor communications bus in the computing device of FIG. 3.

In this regard, FIG. 5 illustrates an exemplary process 90 for mitigating EMI of the victim receiver 54 caused by the aggressor communications bus 56 in the computing device 52 of FIGS. 3 and 4. The process 90 includes receiving information from the coexistence manager 72, wherein the information is related to EMI of the victim receiver 54 as a result of the aggressor communications bus 56 (block 92). To determine the lane assignments in this aspect, the process 90 includes receiving information indicating if the victim receiver 54 experiences EMI as a result of the aggressor communications bus 56 (block 94). Further, the process 90 includes determining the acceptable performance level of the victim receiver 54 (block 96). The process 90 also includes determining the one or more lanes 70(1)-70(6) associated with the interfaces 62, 74 to which to assign the application processor 58 to transmit the application processor signals 64(1)-64(3) and the transceiver 60 to transmit the transceiver signals 66(1)-66(3) to mitigate the EMI experienced by the victim receiver 54 and allow the victim receiver 54 to operate at or above the acceptable performance level (block 98). Notably, other aspects may determine the lane assignment using steps other than those described in blocks 94-98.

With continuing reference to FIG. 5, based on the determination made in block 98, the process 90 also includes assigning the application processor signals 64(1)-64(3) to be transmitted to the lanes 70(4)-70(6) to mitigate the EMI experienced by the victim receiver 54 and allow the victim receiver 54 to operate at or above the acceptable performance level (block 100). Although other aspects may employ alternative metrics, the process 90 determines lane assignments by assigning the application processor signals 64(1)-64(3) to be transmitted to the lanes 70(4)-70(6) associated with the interface 62 located at a furthest physical distance from the victim receiver 54 (block 102). In other words, the lanes 70(4)-70(6) were assigned because the lanes 70(4)-70(6) are located at the furthest physical distance from the victim receiver 54. Further, the process 90 includes instructing the transceiver 60 to assign the transceiver signals 66(1)-66(3) to be transmitted to the lanes 70(4)-70(6) associated with the interface 74 to mitigate the EMI experienced by the victim receiver 54 and allow the victim receiver 54 to operate at or above the acceptable performance level (block 104). Similar to block 102, the lane assignment in this aspect is determined by instructing the transceiver 60 to assign the transceiver signals 66(1)-66(3) to be transmitted to the lanes 70(4)-70(6) associated with the interface 74 because the lanes 70(4)-70(6) are located at a furthest physical distance from the victim receiver 54 (block 106). Notably, the process 90 may be iteratively repeated until the EMI of the victim receiver 54 is mitigated to a desired level. In this manner, each iteration of the process 90 may assign the lanes 70(1)-70(6) at an incremental distance from the victim receiver 54 until the desired level of mitigation is reached. Thus, by employing the process 90, EMI of the victim receiver 54 attributable to the aggressor communications bus 56 may be mitigated.

Figure 6:
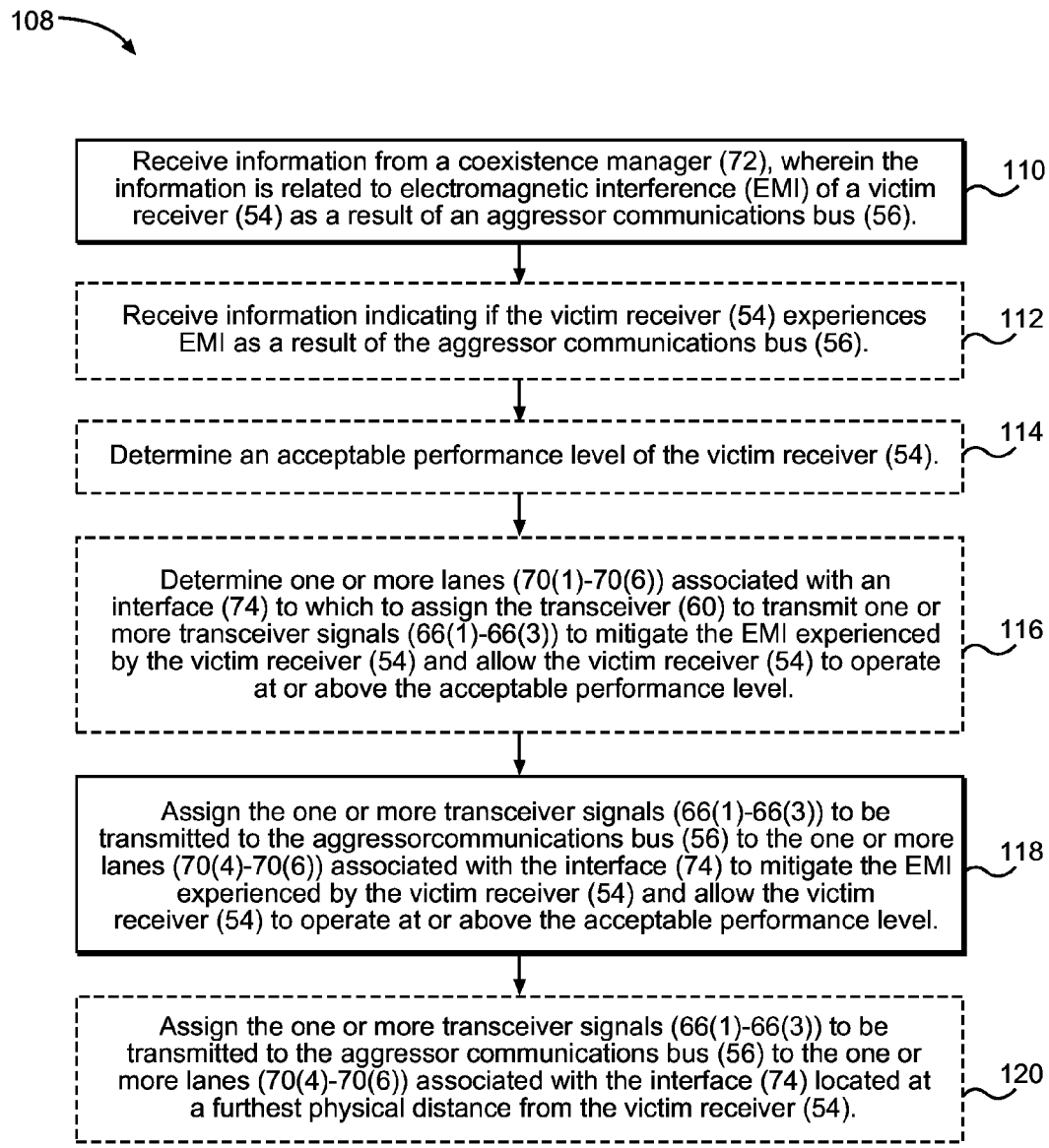
FIG. 6 is a flowchart illustrating another exemplary process for mitigating the EMI of the victim receiver caused by the aggressor communications bus in the computing device of FIG. 3.

In addition to the process 90 of FIG. 5, FIG. 6 illustrates another exemplary process 108 for mitigating EMI of the victim receiver 54 caused by the aggressor communications bus 56 in the computing device 52 of FIGS. 3 and 4. The process 108 includes receiving information, wherein the information is related to the EMI of the victim receiver 54 as a result of the aggressor communications bus 56 (block 110). To determine the lane assignments in this aspect, the process 108 includes receiving information indicating if the victim receiver 54 experiences EMI as a result of the aggressor communications bus 56 (block 112). The process 108 also includes determining the acceptable performance level of the victim receiver 54 (block 114). Further, the process 108 includes determining the lanes 70(1)-70(6) associated with the interface 74 to which to assign the transceiver 60 to transmit the transceiver signals 66(1)-66(3) to mitigate the EMI experienced by the victim receiver 54 and allow the victim receiver 54 to operate at or above the acceptable performance level (block 116). Notably, other aspects may determine the lane assignment using steps other than those described in blocks 112-116.

With continuing reference to FIG. 6, the process 108 includes assigning the transceiver signals 66(1)-66(3) to the lanes 70(4)-70(6) associated with the interface 74 to mitigate the EMI experienced by the victim receiver 54 and allow the victim receiver 54 to operate at or above the acceptable performance level (block 118). Although other aspects may employ alternative metrics, the process 108 determines lane assignments by assigning the transceiver signals 66(1)-66(3) to be transmitted to the lanes 70(4)-70(6) associated with the interface 74 located at a furthest physical distance from the victim receiver 54 (block 120). In other words, the lanes 70(4)-70(6) were assigned because the lanes 70(4)-70(6) are located at the furthest physical distance from the victim receiver 54. Notably, the process 108 may be iteratively repeated until the EMI of the victim receiver 54 is mitigated to a desired level. In this manner, each iteration of the process 108 may assign the lanes 70(1)-70(6) at an incremental distance from the victim receiver 54 until the desired level of mitigation is reached. Thus, by employing the process 108, EMI of the victim receiver 54 attributable to the aggressor communications bus 56 may be mitigated.

The aspects of dynamic lane management for interference mitigation according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An application processor comprising:
    an interface, configured to:
        couple to an aggressor communications bus;
        transmit one or more application processor signals to the aggressor communications bus; and
        receive one or more transceiver signals from the aggressor communications bus; and
    a control system, configured to:
        receive information from a coexistence manager, the information related to electromagnetic interference (EMI) of a victim receiver as a result of the aggressor communications bus;
        assign the one or more application processor signals to be transmitted to the aggressor communications bus to one or more lanes associated with the interface to mitigate the EMI experienced by the victim receiver and allow the victim receiver to operate at or above an acceptable performance level; and
        instruct a transceiver to assign the one or more transceiver signals to be transmitted to the aggressor communications bus to the one or more lanes associated with the interface to mitigate the EMI experienced by the victim receiver and allow the victim receiver to operate at or above the acceptable performance level.

2. The application processor of claim 1, wherein the information received from the coexistence manager comprises information indicating the one or more lanes associated with the interface to which to assign the application processor to transmit the one or more application processor signals and the transceiver to transmit the one or more transceiver signals.

3. The application processor of claim 1, wherein the information received from the coexistence manager comprises:
    information indicating if the victim receiver experiences EMI as a result of the aggressor communications bus; and
    the acceptable performance level of the victim receiver.

4. The application processor of claim 1, wherein the control system is configured to assign the one or more application processor signals by being configured to assign the one or more application processor signals to be transmitted to the aggressor communications bus to the one or more lanes associated with the interface located at a furthest physical distance from the victim receiver.

5. The application processor of claim 1, wherein the control system is configured to instruct the transceiver to assign the one or more transceiver signals by being configured to instruct the transceiver to assign the one or more transceiver signals to be transmitted to the aggressor communications bus to the one or more lanes associated with the interface located at a furthest physical distance from the victim receiver.

6. The application processor of claim 1, wherein:
    the one or more application processor signals comprise one or more clock signals; and
    the one or more transceiver signals comprise one or more clock signals.

7. The application processor of claim 1, wherein:
    the one or more application processor signals comprise one or more data signals; and
    the one or more transceiver signals comprise one or more data signals.

8. The application processor of claim 1, wherein a number of the one or more lanes associated with the interface is greater than a number of the one or more application processor signals transmitted by the application processor.

9. The application processor of claim 1, further comprising a multiplexer configured to provide the one or more application processor signals transmitted by the application processor to the one or more lanes associated with the interface assigned by the control system.

10. The application processor of claim 1, further comprising the coexistence manager.

11. The application processor of claim 1, wherein the application processor receives the information from the coexistence manager employed remotely from the application processor.

12. The application processor of claim 1, wherein the aggressor communications bus is one of the group consisting of: a Peripheral Component Interconnect (PCI) bus; a PCI Express (PCIe) bus; a SuperSpeed Universal Serial Bus Inter-Chip (SSIC) bus; and a Universal Flash Storage (UFS) bus.

13. The application processor of claim 2, wherein the coexistence manager is configured to:
    receive information indicating if the victim receiver experiences EMI as a result of the aggressor communications bus;
    determine the acceptable performance level of the victim receiver; and
    determine the one or more lanes associated with the interface to which to assign the application processor to transmit the one or more application processor signals and the transceiver to transmit the one or more transceiver signals to mitigate the EMI experienced by the victim receiver and allow the victim receiver to operate at or above the acceptable performance level.

14. The application processor of claim 3, wherein the control system is further configured to determine the one or more lanes associated with the interface to which to assign the application processor to transmit the one or more application processor signals and the transceiver to transmit the one or more transceiver signals to mitigate the EMI experienced by the victim receiver and allow the victim receiver to operate at or above the acceptable performance level.

15. A method for mitigating electromagnetic interference (EMI) experienced by a victim receiver as a result of an aggressor communications bus, comprising:
    receiving information from a coexistence manager, the information related to EMI of a victim receiver as a result of an aggressor communications bus;

assigning one or more application processor signals to be transmitted to the aggressor communications bus to one or more lanes associated with an interface to mitigate the EMI experienced by the victim receiver and allow the victim receiver to operate at or above an acceptable performance level; and instructing a transceiver to assign one or more transceiver signals to be transmitted to the aggressor communications bus to the one or more lanes associated with the interface to mitigate the EMI experienced by the victim receiver and allow the victim receiver to operate at or above the acceptable performance level.

16. The method of claim 15, further comprising:

receiving information indicating if the victim receiver experiences EMI as a result of the aggressor communications bus;

determining the acceptable performance level of the victim receiver; and determining the one or more lanes associated with the interface to which to assign an application processor to transmit the one or more application processor signals and the transceiver to transmit the one or more transceiver signals to mitigate the EMI experienced by the victim receiver and allow the victim receiver to operate at or above the acceptable performance level.

17. The method of claim 15, wherein assigning the one or more application processor signals comprises assigning the one or more application processor signals to be transmitted to the aggressor communications bus to the one or more lanes associated with the interface located at a furthest physical distance from the victim receiver.

18. The method of claim 15, wherein instructing the transceiver to assign the one or more transceiver signals comprises instructing the transceiver to assign the one or more transceiver signals to be transmitted to the aggressor communications bus to the one or more lanes associated with the interface located at a furthest physical distance from the victim receiver.

19. A transceiver comprising:

an interface, configured to:
  couple to an aggressor communications bus;
  transmit one or more transceiver signals to the aggressor communications bus; and
  receive one or more application processor signals from the aggressor communications bus; and a control system, configured to:
  receive information related to electromagnetic interference (EMI) of a victim receiver as a result of the aggressor communications bus; and
  assign the one or more transceiver signals to be transmitted to the aggressor communications bus to one or more lanes associated with the interface to mitigate the EMI experienced by the victim receiver and allow the victim receiver to operate at or above an acceptable performance level.

20. The transceiver of claim 19, wherein the received information comprises information indicating the one or more lanes associated with the interface to which to assign the transceiver to transmit the one or more transceiver signals.

21. The transceiver of claim 19, wherein the control system is configured to assign the one or more transceiver signals by being configured to assign the one or more transceiver signals to be transmitted to the aggressor communications bus to the one or more lanes associated with the interface located at a furthest physical distance from the victim receiver.

22. The transceiver of claim 19, wherein the one or more transceiver signals comprise one or more clock signals.

23. The transceiver of claim 19, wherein the one or more transceiver signals comprise one or more data signals.

24. The transceiver of claim 19, wherein a number of the one or more lanes associated with the interface is greater than a number of the one or more transceiver signals transmitted by the transceiver.

25. The transceiver of claim 19, wherein the transceiver further comprises a multiplexer configured to provide the one or more transceiver signals transmitted by the transceiver to the one or more lanes associated with the interface assigned by the control system.

26. The transceiver of claim 19, wherein the aggressor communications bus is one of the group consisting of: a Peripheral Component Interconnect (PCI) bus; a PCI Express (PCIe) bus; a SuperSpeed Universal Serial Bus Inter-Chip (SSIC) bus; and a Universal Flash Storage (UFS) bus.

27. The transceiver of claim 20, wherein a coexistence manager is configured to:

receive information indicating if the victim receiver experiences EMI as a result of the aggressor communications bus;

determine the acceptable performance level of the victim receiver; and determine the one or more lanes associated with the interface to which to assign the transceiver to transmit the one or more transceiver signals to mitigate the EMI experienced by the victim receiver and allow the victim receiver to operate at or above the acceptable performance level.

28. A method for mitigating electromagnetic interference (EMI) experienced by a victim receiver as a result of an aggressor communications bus, comprising:

receiving information related to EMI of a victim receiver as a result of an aggressor communications bus; and assigning one or more transceiver signals to be transmitted to the aggressor communications bus to one or more lanes associated with an interface to mitigate the EMI experienced by the victim receiver and allow the victim receiver to operate at or above an acceptable performance level.

29. The method of claim 28, further comprising:

receiving information indicating if the victim receiver experiences EMI as a result of the aggressor communications bus;

determining the acceptable performance level of the victim receiver; and determining the one or more lanes associated with the interface to which to assign a transceiver to transmit the one or more transceiver signals to mitigate the EMI experienced by the victim receiver and allow the victim receiver to operate at or above the acceptable performance level.

30. The method of claim 28, wherein assigning the one or more transceiver signals comprises assigning the one or more transceiver signals to be transmitted to the aggressor communications bus to the one or more lanes associated with the interface located at a furthest physical distance from the victim receiver.

* * * * *